United States Patent [19]
Snow

[11] 3,751,195
[45] Aug. 7, 1973

[54] HEAT-TREATING-FURNACE ROLL AND METHOD OF HEAT-TREATING METAL STRIP THEREWITH

[75] Inventor: Roland B. Snow, Mount Lebanon Twsp., Allegheny County, Pa.

[73] Assignee: United States Steel Corporation, Pittsburgh, Pa.

[22] Filed: Aug. 18, 1971

[21] Appl. No.: 172,947

Related U.S. Application Data

[63] Continuation-in-part of Ser. No. 113,183, Feb. 8, 1971, abandoned.

[52] U.S. Cl. .................. 432/8, 148/16, 432/246, 193/37
[51] Int. Cl. .............................. F26b 9/00
[58] Field of Search .................. 263/6 C, 6 R

[56] References Cited
UNITED STATES PATENTS

| | | |
|---|---|---|
| 1,737,117 | 11/1929 | Morton .................. 263/6 C |
| 2,772,872 | 12/1956 | Ornitz .................. 263/6 C |
| 3,456,931 | 7/1969 | Ermenc et al .................. 263/6 C |
| 3,511,482 | 5/1970 | Haite .................. 263/6 C |

*Primary Examiner*—John J. Camby
*Assistant Examiner*—Henry C. Yuen
*Attorney*—Donald S. Ferito

[57] ABSTRACT

Roll of the invention includes a roll body of metal and a sleeve, made up of fused silica particles sinter bonded with colloidal silica or cement, or a mixture of fused silica particles and particles of other oxides sinter bonded with colloidal silica or cement, or sinter bonded fireclay granules, fixedly surrounding the roll body. Method of the invention consists of the steps of supporting strip which is being heat-treating at a temperature above 1000°F by a surface consisting of sintered fused silica particles, sintered fused silica mixed with other oxide particles, or sintered fireclay granules to inhibit formation of accretions on the supporting surface.

12 Claims, 2 Drawing Figures

3,751,195

INVENTOR.
ROLAND B. SNOW
By
Donald S. Ferito
Attorney

HEAT-TREATING-FURNACE ROLL AND METHOD OF HEAT-TREATING METAL STRIP THEREWITH

This application is a continuation-in-part of my co-pending application Ser. No. 113,183 filed Feb. 8, 1971, now abandoned. The present invention relates generally to heat-treating-furnace rolls and a method of heat-treating metal strip at relatively high temperatures in which the strip is supported by the rolls of the invention.

More particularly, particularly, the invention relates to furnace conveyor rolls around which metal strip is passed and advanced through continuous heating furnaces, such as annealing furnaces, to be heated to relatively high temperatures therein.

BACKGROUND OF THE INVENTION

Conveyor rolls used in continuous strip annealing furnaces prior to my invention tended to collect accretions of material from the strip which dented or otherwise marred subsequent strip passing over or around the rolls. The problem was particularly acute in the treatment of silicon steels and other steels requiring relatively high annealing temperatures, for example, temperatures above 1000°F to temperatures in excess of 1600°F. Such accretion formation is complex and is influenced by the tension of the strip passing around the rolls, the composition of the strip, and the composition and temperature of the furnace atmosphere as well as the character of the roll surface. It is to the latter element to which the roll and method of my invention are particularly directed.

Prior to my invention, refractory inserts such as silicon carbide were used in furnace conveyor elements in such a way that the refractory inserts supported the strip passing through the furnace. U. S. Pat. No. 1,951,766 discloses furnace conveyor elements provided with refractory elements for supporting the work passing through the furnace. While no oxide coating forms on silicon carbide inserts and rolls provided therewith are satisfactory for annealing sheets, it was found that in continuous strip annealing furnaces where the strip wraps around the rolls under tension, and especially in annealing silicon steel strip, accretions formed on the silicon carbide inserts. Furthermore, the provision and installation of the refractory inserts entailed substantial labor and expense.

Another device tried for preventing accretions on strip supporting surfaces during high temperature annealing was to provide a roll having a removable carbon sleeve. U. S. Pat. No. 2,603,578 teaches a method of heat-treating silicon steel including the use of rolls faced with either graphite or amorphous carbon. Such rolls were not satisfactory for use in all atmospheres or in the higher ranges of strip tension.

U. S. Pat. No. 2,778,872 teaches the use of roll-sleeves made essentially of baked graphite particles and a binder. Although the carbon roll-sleeves were moderately successful, difficulty was experienced resulting from uneven oxidation of the carbon sleeve. This caused "hard-spots" on the roll which indented strip subsequently passing over the roll. When this happened, the rolls had to be removed and the roll-sleeves re-dressed. A further disadvantage with rolls having carbon sleeves was the fact that such rolls could not be removed from the furnace without cooling. If the rolls were removed at elevated temperatures, the sleeves would burn in the air.

Accordingly, it is the primary object of my invention to provide a heat-treating-furnace roll made up of a metal roll body and a sleeve of a non-oxidizing material, such as sinter bonded fused silica fines, fused silica particles mixed with particles of other oxides sinter bonded with colloidal silica or cement, or sinter bonded fireclay granules, surrounding the roll body, and the method of using such rolls during high temperature treatment of metal strip, such as silicon strip.

It is a more specialized object of my invention to provide a roll as set forth in the above object having a sleeve made of fused silica fines that have been sinter bonded with colloidal silica or cement binder resulting in a sleeve which will have a minimum degree of expansion or contraction when subjected to changes of temperature.

Another more specialized object of my invention is to provide a heat-treating-furnace roll having a metal body and sleeve of a non-oxidizing material made of fused silica fines mixed with 0.5 to 20.0 percent of other oxides sinter bonded with colloidal silica or cement surrounding the metal roll body.

A further specialized object of my invention is to provide a roll for heat-treating metal strip at relatively high temperatures which roll is formed with a roll body and a sleeve surrounding the body made of granular fireclay that is sinter bonded with cement or other cold set binders.

These and other objects will become more apparent after referring to the following specification and attached drawing, in which:

DESCRIPTION OF THE PREFERRED EMBODIMENTS

Figure 1:
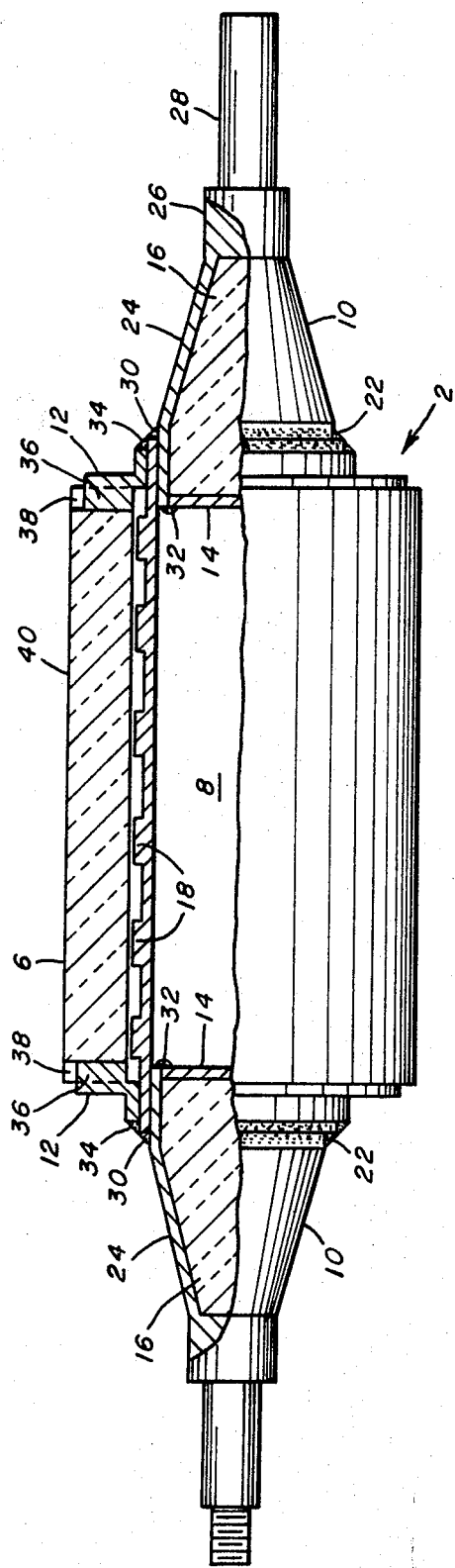
FIG. 1 is a front elevational view partly in section of a roll of the invention.
Figure 2:
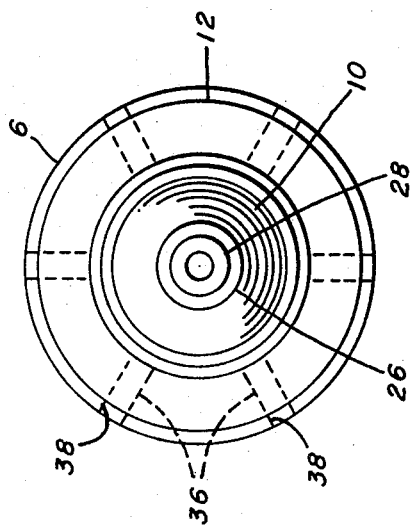
FIG. 2 is an end view of the roll of FIG. 1.

Referring more particularly to the drawing, reference numeral 2 indicates generally a roll constructed in accordance with the invention. Roll 2 includes a metal hollow barrel roll body 8 having a porous ceramic sleeve 6 rigidly disposed therearound. A preferred ceramic sleeve is generally composed of crushed fragments of $SiO_2$ glass which are mixed with colloidal silica then formed into a roll sleeve and fired, preferably to approximately 1800°F, to produce a sinter bonded silica glass sleeve that resists metal abrasion from the strip that passes over the sleeve.

The sleeve 6 is preferably molded from silica glass fines with a colloidal silica or cement binder and then baked to provide a sinter bond of good strength. The fines are prepared by fusing quartz ($SiO_2$) fragments to form a glass; the glass is then quenched and pulverized. The pulverized glass is then molded into the shape and size of sleeve 6 with a colloidal silica or cement binder and then sinter baked to provide a porous sleeve having good strength. The sleeve 6 thus formed has excellent spalling resistance and may be inserted into or removed from a hot furnace without damage. The silica sleeve 6 has a low thermal conductivity as compared to silicon carbide inserts or carbon facing or carbon sleeves used prior to my invention, and thus the fused silica sleeve 6 of the invention will transmit less heat to the roll body; this provides for a more stable roll assembly. The bonded silica fines are relatively inexpensive and provide an appreciable cost savings. The fused silica sleeve 6 does not have to be taken from the heat-treating furnace periodically to restore a crown thereon. In addition, at temperatures approaching 1800°F, the surface of the silica glass sleeve 6 will devitrify and under these conditions silica glass roll-sleeves could be used in vertical heat-treating furnaces such as is shown in FIG. 1 of U.S. Pat. No. 2,603,578.

The sintered silica-glass composition of sleeve 6 has a bulk density of approximately 110 to 120 lbs./cu. ft. which is substantially a maximum for slip-cast material. The low thermal conductivity of this material (5.4 BTU/in./hr./sq. ft. per °F) provides for a heat savings in the furnace because less heat is transferred to the steel center portion of the roll. This value will vary if there is a change in the bulk density of the fixed roll sleeve. The sintered silica-glass composition has a low rate of thermal expansion ($0.3 \times 10^{-6}$ from 0 to 1800°F) which is important because it permits hot roll changes without cracking the ceramic sleeve and if there is some metal pick-up, the metal has so much greater contraction on cooling than the sintered silica-glass sleeve that the metal pick-up will pull loose from the sleeve on cooling to room temperature or by variation of temperature during the furnace cycle. Any such metal pick-up is in the form of elongated 1/16 to 1/2 inch deposits and such pick-up would not form a continuous layer around the sleeve. While it is preferred that the thermal expansion be approximately $0.3 \times 10^{-6}$ or less, it may be as high as $0.5 \times 10^{-6}$.

The sintered silica roll sleeves of the invention are more easily resurfaced than sleeves of other materials and in the event that there is some pick-up of metal or iron oxide that does not come loose on cooling down, the sintered silica-glass sleeve is easily reground; in many cases even fine sand paper held in one's hand can be used to remove such metal pick-up if it occurs.

At a temperature of 1900° to 1950°F in a high water vapor atmosphere the metal pick-up has been removed in normal operations without cooling down of the furnace by the fluxing reaction between the silica roll and FeO formed by the oxidation of the iron in the pick-up. The liquid formed is relatively fluid and the liquid oxide smears over the surface while the roll is turning and the oxide may even enter the pore spaces between the sintered silica particles. With other ceramic oxides that might be used for roll sleeves such as 100 percent alumina ($Al_2O_3$) this iron oxide reaction product would be a solid and a build-up could continue. However, a small amount of $Al_2O_3$ in the pores of the sleeve or the roll body may aid in the removal of this pick-up because limited amounts of $Al_2O_3$ lower the temperature at which the reaction between FeO and silica becomes liquid.

Particles of other oxides such as fireclay CaO, MgO, $Al_2O_3$, $ZrSiO_4$, and/or $Cr_2O_3$ can be added to fused silica glass in amounts of between 0.5 to 20 percent without greatly affecting the favorable thermal expansion, conductivity, or spalling resistance of the similar bonded silica sleeve. Each of these oxides or combinations will be limited by their effect on the thermal properties of the final body. Clay such as calcined kaolin ($Al_2Si_2O_7$) can be added in the greatest amount. It is also possible to change the chemical characteristics of the roll surface by partially or completely impregnating the pores in the surface of the silica sleeve with a substance which breaks down upon heating to deposit chemical impurities in the pore spaces. After heating to 800°F any chromic acid $CrO_3 \times H_2O$ which may enter the pores is converted to $Cr_2O_3$. Other chemical substances such as aluminum chloride might be used to change the surface chemistry of the roll without changing the general characteristics of the sinter bonded silica glass particles in the roll sleeve.

If desired, an alternate composition can be used for forming sleeve 6. This composition may be granular fireclay that is sinter bonded with cement or other cold set binders.

The roll body 8 includes two tapered shaft ends 10. A drive ring 12 is circumferentially disposed around each end of the roll body 8 and a closure plate 14 is disposed at each end of the roll body. The shaft ends 10 are each filled with insulating material 16. The roll body 8, the shaft ends 10, the drive rings 12 and the closure plates 14 may be made of any suitable ferrous or nonferrous high temperature alloy such as is ordinarily used in the manufacture of furnace conveyor elements.

The roll body 8 is formed with axially spaced circumferential projections or lands 18 forming bearings for sleeve 6. No venting of the roll body 8 is necessary since the sleeve 6 is sufficiently porous due to the sinter bonding of the silica fines, mixture of silica fines and other oxides, or the granular fireclay during manufacture of the sleeve. The shaft ends 10 are provided with cylindrical portions 22 fitting within the ends of the roll body 8, tapered portions 24, and cylindrical end portions 26 and 28 of relatively great and relatively small diameter, respectively. The roll may be mounted for rotation in a heat-treating furnace in a conventional manner.

The ends of the roll body 8 may be welded to the shaft ends 10 by welds 30 and the closure plates 14 may be welded to the shaft ends 10 by welds 32. The drive rings 12 may be welded to the roll body 8 by welds 34, but one of the drive rings is not installed and welded to the barrel until after the sleeve 6 has been put in place on the roll body 8. Each of the drive rings 12 has a series of circumferentially spaced radially and axially extending projections 36 each of which enters a slot 38 provided therefor in one of the ends of the sleeve 6 thus locking the sleeve to the roll body 8 so that the roll and sleeve function as a single unit. The slots 38 may be molded into the sleeve 6 at the time of its formation or may be drilled after the piece has been molded and baked. 8 so The sintered sleeve 6 constitutes the work engaging portion of the roll and its outer cylindrical surface 40 supports the strip as it travels through the furnace.

Although I have described but three embodiments of my invention, other adaptations and modifications may be made without departing from the scope of the following claims.

I claim:

1. In the heat treatment of metal strip such as silicon steel strip in which said strip is heated to a temperature above 1000°F, the improvement therewith of supporting said strip during the heat treatment by a surface made up of one of the group consisting of sinter bonded fused silica; sinter bonded fused silica having a content of up to 20 percent of at least one of the group consisting of fireclay, CaO, MgO, $Al_2O_3$, $ZrSiO_4$, and $Cr_2O_3$; and granular fireclay sinter bonded with a cold set binder to inhibit formation of accretions on said supporting surface.

2. The heat treatment of metal strip according to claim 1 in which said strip is supported during the heat treatment by a surface consisting of sinter bonded fused silica.

3. The heat treatment of metal strip according to claim 1 in which said strip is supported during the heat treatment by a surface consisting of sinter bonded fused silica having a content of up to 20 percent of at least one of the group consisting of fireclay, CaO, MgO, $Al_2O_3$, $ZrSiO_4$, and $Cr_2O_3$.

4. The heat treatment of metal strip according to claim 1 in which said strip is supported during the heat treatment by a surface consisting of granular fireclay sinter bonded with a cold set binder.

5. A roll for supporting objects at elevated temperatures comprising a roll body, porous sleeve surrounding said roll body, said sleeve being composed of one of the group consisting of sinter bonded fused silica; sinter bonded fused silica having a content of up to 20 percent of at least one of the group consisting of fireclay, CaD, MgO, $Al_2O_3$, $ZrSiO_4$, and $Cr_2O_3$.

6. A roll according to claim 5 in which said sleeve has a maximum thermal coefficient of expansion from 0° to 1800°F of approximately $0.5 \times 10^{-6}$.

7. A roll according to claim 5 in which said sleeve has a maximum thermal coefficient of expansion from 0° to 1800°F of approximately $0.3 \times 10^{-6}$.

8. A roll according to claim 5 in which said sleeve consists substantially of fused silica fines sinter bonded with a colloidal silica binder.

9. A roll according to claim 5 in which said sleeve consists substantially of fused silica fines sinter bonded with a cement binder.

10. A roll according to claim 5 in which said sleeve consists substantially of a mixture of fused silica fines and up to 20 percent of at least one of the group consisting of fireclay, CaO, MgO, $Al_2O_3$, $ZrSiO_4$, and $Cr_2O_3$, said mixture being sinter bonded with a colloidal silica binder.

11. A roll according to claim 5 in which said sleeve consists substantially of a mixture of fused silica fines and up to 20 percent of at least one of the group consisting of fireclay, CaO, MgO, $Al_2O_3$, $ZrSiO_4$, and $Cr_2O_3$, said mixture being sinter bonded with a cement binder.

12. A roll for supporting objects at elevated temperatures comprising a roll body, a porous sleeve surrounding said roll body, said sleeve being composed substantially of granular fireclay sinter bonded with a cold set binder.

* * * * *

UNITED STATES PATENT OFFICE
CERTIFICATE OF CORRECTION

Patent No. 3,751,195    Dated August 7, 1973

Inventor(s)  Roland B. Snow

It is certified that error appears in the above-identified patent and that said Letters Patent are hereby corrected as shown below:

Column 1, line 10, cancel "particularly,", second occurrence. Column 2, line 19, after "and" insert -- a --. Column 3, line 10, "110to" should read -- 110 to --. Column 4, line 46, "8so" should read -- 8 so --; line 50, after "baked." cancel "8 so". Column 5, claim 5, line 18, after "body," insert -- a --; line 23, "CaD" should read -- CaO --.

Signed and sealed this 12th day of February 1974.

(SEAL)
Attest:

EDWARD M. FLETCHER, JR.
Attesting Officer

C. MARSHALL DANN
Commissioner of Patents